Oct. 8, 1968
A. E. SCHAEWE ET AL
3,404,509
METHOD AND APPARATUS FOR LOADING ASSEMBLED
LAYERS OF PACKAGES IN CASES
Filed July 6, 1965
3 Sheets-Sheet 1
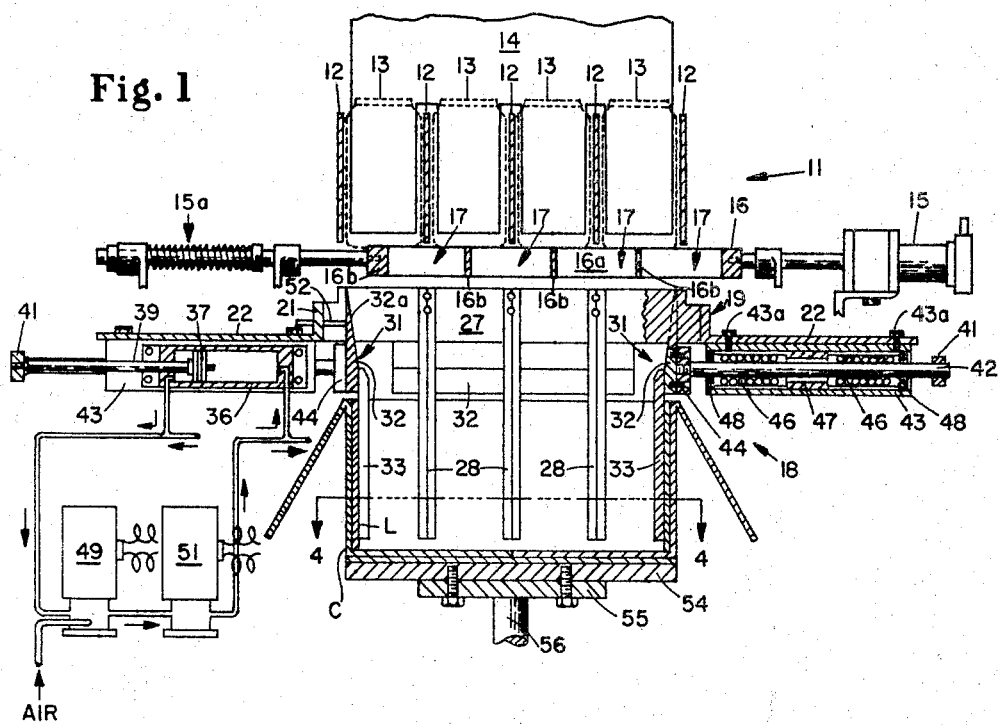
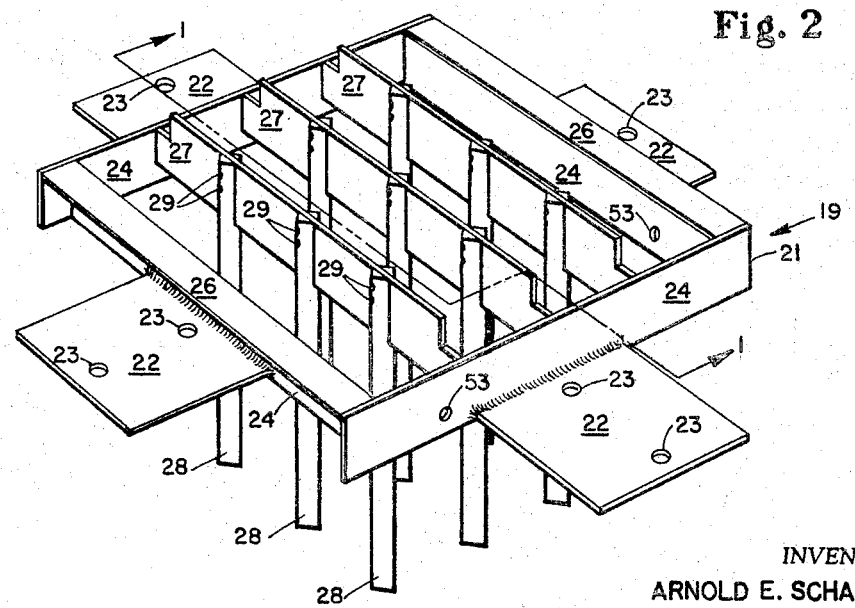
INVENTORS
ARNOLD E. SCHAEWE AND
EDWARD H. GASTRIGHT
ATTORNEY

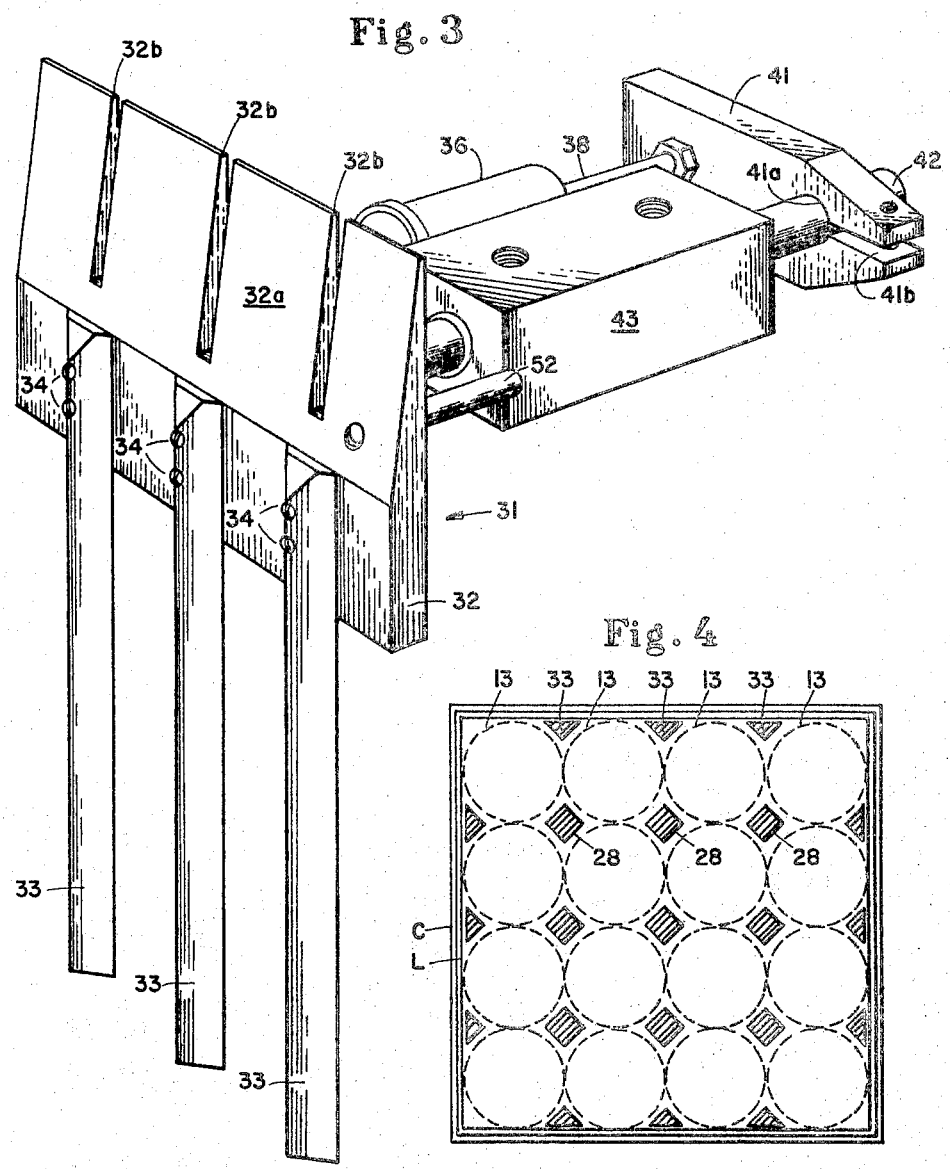

INVENTORS
ARNOLD E. SCHAEWE AND
EDWARD H. GASTRIGHT
ATTORNEY 3,404,509
METHOD AND APPARATUS FOR LOADING ASSEMBLED LAYERS OF PACKAGES IN CASES
Arnold E. Schaewe, Cincinnati, Ohio, and Edward H. Gastright, Fort Thomas, Ky., assignors to The Procter & Gamble Company, Cincinnati, Ohio, a corporation of Ohio
Filed July 6, 1965, Ser. No. 469,630
11 Claims. (Cl. 53—35)

ABSTRACT OF THE DISCLOSURE

An apparatus and method for increasing the interior dimensions of a case for the reception of a layer of packages. The side walls of the case are simultaneously forced outwardly immediately prior to the loading operation whereby to assume a configuration at least as large as the periphery of the layer following loading. Subsequent to loading, the outwardly directed force acting on the case side walls are removed.

---

This invention relates to a method and apparatus for loading assembled layers of packages in shipping cases and more particularly to the loading of assembled layers of unnested fragile packages in a case adapted to closely conform to the peripheral dimensions of the layer following the loading operation. As used herein the term "unnested" is intended to apply to an arrangement of packages in which freespaces or voids are located intermediate adjacent packages. Such, of course, would not apply to tight-fitting rectangular packages, for example, since there would be no freespace therebetween.

The present invention is adapted to be used in connection with prior art apparatus for loading layers of product in cases, as exemplified by United States Letters Patent 2,727,664 which issued to E. Ardell on Dec. 20, 1955. In such apparatus lines of packages are transported along feed conveyors into the machine adjacent a layer assembly and dropping station and rows of a specified number of said packages are sequentially swept at right angles of said conveyor toward said station by a movable series of spaced plates. A series of spaced stationary guides which extend parallel to the direction of movement of the plates maintains the individual packages comprising the rows in spaced relation whereby a full layer of rows is assembled in the station with the individual packages separated one from the other by the guides and plates. A formed shipping case, the top closure flaps of which are spread open, is brought into position directly underlying the station and the entire layer of packages is released and dropped by gravity into said case. In most of such devices, as illustrated by the Ardell apparatus, spring fingers are used to control the downward movement of the packages as they drop into the case. In other devices, web-like chutes are used to control such movement. While such devices are satisfactory in most respects, it is a common shortcoming that the same are incapable of placing the packages within a shipping case in which said layer is tightly packed.

Other types of casepackers employ springy sheet metal plates arranged in a rectangular tapered configuration as a chute over which the empty case is telescoped and held. The packages are assembled in a layer and the entire layer is rammed through the chute into the case, spreading the plates as required as the layer passes through the chute into the case. The case is stripped from the chute after the packages are pressed against the bottom of the case by further pressure on the top surface of the layer. These types of casepackers are capable of placing the packages more tightly in a case, but still must allow sufficient clearance between the layer and the sides of the case to accept the thickness of the plates and, moreover, have utility only in connection with packages which are not susceptible to damage. Consequently, such forms of casepackers cannot be utilized for encasing fragile packages.

A further shortcoming of the prior art devices is that if a portion of the supply of cases to be loaded is undersize, as will be found occasionally in mass produced items, the packages will not fit within the case unless an uneconomical amount of clearance is allowed. In most instances, the layer will jam in the chute or spring finger guides, causing damage in the charge-directing stations which necessitates shutdown, cleanup and repair operations before production can resume. This is extremely expensive and inconvenient since the casepacker is normally an integral part of high speed production lines and therefore shutdown of the casepacker requires a shutdown of the balance of the production line.

A still further shortcoming of the prior art gravity feed devices is that the same do not include means by which liner-equipped cases can be loaded with product packages without problems in holding the liner in place against the sides of the case. Unless such liners are positively controlled, jams of product as described above will also occur.

Another such shortcoming is that the prior art casepackers do not generally employ automatic case positioning mechanisms which are sufficiently reliable to avoid occasional damage to the machine and/or packages due to misalignment of the cases with the charge-directing devices.

It is an object of this invention to obviate the above difficulties.

Another object of the present invention is to provide a method and apparatus by which layers of fragile packages can be tightly encased without damage to the packages and/or apparatus whereby to economize in packaging and production costs.

It is a further object of the present invention to provide a method and apparatus adapted to position a case to properly receive a layer of unnested packages, to stretch said case sufficiently to accept said layer without the possibility of jamming as the layer is moved into the case and, when required, to move and hold a liner tightly in position as the loading operation proceeds.

Briefly stated, in accordance with one aspect of the present invention there is provided, in a machine for loading an assembled rectilinear layer of unnested packages in a case, a case locating and stretching device having two pairs of parallel, opposed, case engaging members each of which is aligned with a side of the layer and has a row of rigid, finger-like extensions depending therefrom. The extensions are sized and located to fit within the freespace enclosed by the end packages of adjacent rows of the layer and the interior sidewall of the case. Means is also provided to move the case approximately to a position to receive the layer and to remove the case following the loading of the layer. The device incorporates control means to simultaneously move the members to correspondingly change the spacing between each pair. The control means causes the members to selectively move inwardly to a contracted position in which the extensions loosely telescope in an empty case or move outwardly to an expanded position in which the extensions assume a recangular configuration at least as large as the periphery of the layer following loading. The control means is also capable of selectively causing the members to be relaxed, i.e., independently, substantially freely movable inwardly and outwardly between the expanded and contracted positions.

While the specification concludes with claims particularly pointing out and distinctly claiming the subject matter which is regarded as forming the present invention, it is believed that the invention will be better understood from the following description taken in connection with the accompanying drawings, in which:

FIGURE 1 is a fragmentary vertical sectional view, through a preferred embodiment of the case locating and stretching apparatus of the present invention in which the case engaging members are moving to an expanded position;

FIGURE 2 is a perspective view of the funneling grid of FIGURE 1;

FIGURE 3 is a perspective view of a case engaging member of FIGURE 1 and part of the control means associated therewith;

FIGURE 4 is a sectional view taken along line 4—4 of FIGURE 1 but with the case engaging members in a relaxed condition;

Figure 5:
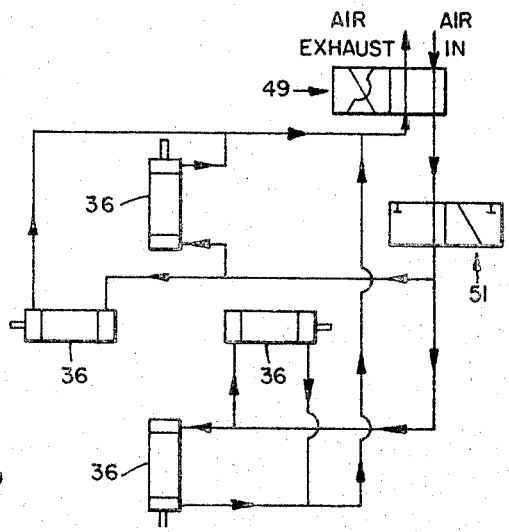
FIGURE 5 is a schematic view of the control means of FIGURE 1 in which the valves are positioned to urge the case engaging members to the expanded position.

Referring to FIGURE 1, there is shown a layer assembly and dropping station indicated generally by reference numeral 11 and substantially identical with the charge forming mechanism fully described in the above-mentioned Ardell patent. The layer assembly and dropping station 11 comprises a plurality of stationary guides 12 spaced from one another and extending from an infeed conveyor, not shown, across the full length of station 11. Rows of packages, such as the lightweight plastic cans 13 shown in phantom, are moved in a direction parallel to guides 12 by a series of uniformly spaced movable plates 14 which are slotted to permit the intermeshing thereof with the stationary guides 12.

The plates 14 are at right angles with the guides 12 and move intermittently, sweeping one or more rows of packages, as desired, from the infeed conveyor and feeding the same toward the station 11 with each of the intermittent movements. Thus, successive rows of packages, such as the row of cans 13 illustrated, are fed to the station 11, the rows being closely spaced though separated from one another by the plates 14. The individual packages comprising the rows are separated from each other and maintained in alignment with corresponding packages in the other rows by the stationary guides 12.

Suitable means is provided to support the layer of packages as it is being formed and to control the timing of its descent into a case. The means can comprise a laterally shiftable auxiliary grid-like structure 16 which is arranged below the stationary guides 12. Grid 16 includes pockets 17 of the same shape and dimensions as the individual cells formed by the intermeshing stationary guides 12 and movable plates 14, the pockets 17 being shiftable to alternately be located in staggered relation with the cells of the guides and plates in one position and in direct alignment therewith in another position. The grid 16 is formed of a multiplicity of cross strips 16a which are parallel to the movable plates 14 and strips 16b parallel to the guides 12.

In either position the cross strips 16a of the grid 16 are located directly underneath the movable plates 14 when the layer in in its final assembled location. In the staggered position, a strip 16b is between each pair of adjacent stationary guides and forms the sole vertical support for the packages during the layer accumulation cycle. In the aligned position, each strip 16b is directly below one of the stationary guides 12 and therefore there is no vertical support for the packages. The movement of the grid 16 is achieved by an air cylinder 15 adapted to quickly change the grid position from staggered to aligned upon actuation and by a spring return arrangement 15a to move the grid 16 to staggered position when the layer has dropped through the grid and the air cylinder is deactivated. Such devices are well known in the art and therefore are not described in detail herein.

In the illustrated apparatus a layer comprises four rows of four packages each and, consequently, when four rows have been moved off the infeed conveyor to the station 11, a layer is fully assembled and ready to be dropped into a case by movement of the grid 16 to the aligned position. It will be understood that in the assembled condition the rows of packages comprising the layer have been moved to a predetermined position directly overlying the case locating and stretching device of the present invention, which is generally indicated by reference numeral 18.

The case loading and stretching device 18 is supported by a funneling guide assembly 19 which directly underlies the grid 16 and is vertically centered with the stationary guides 12 and movable plates 14 when the layer is fully accumulated. The assembly 19 is rigidly mounted to a suitable portion of the frame of the casepacking machine by support means which are not shown. As illstrated most clearly in FIGURE 2, the asembly 19 comprises a rigid frame 21 to each side 24 of which is permanently affixed an outwardly extending mounting plate 22 provided with clearance holes 23 by means of which bushing blocks, hereinafter described, are attached. The mounting plates 22 can be made of separate pieces integrally joined to the balance of the frame 21 by welding. The sides 24 and bracing members can be 2″ to 3″ wide steel strips having a thickness of approximately 3/8″ and welded together along contacting edges to unify the structure. Extending between two of the opposed sides 24 are a multiplicity of parallel, spaced supports 27 which can also be welded in place and which are preferably thinner than the movable plates 14. The location and the spacing between the supports 27 is such as to place the same in alignment with movable plates 14 of the layer assembly and dropping station 11, when the layer is fully assembled. In this connection, if round packages having a diameter of 3″ are to be encased, the distance between adjacent plates 14, and between adjacent guides 12 should be about 3 1/16″. The top surfaces of the supports 27 of the embodiment shown in the drawings are higher than that of the frame 21 so as to place the supports close to the underside of grid 16. This height relationship between the supports and frame, however, is otherwise unimportant.

A plurality of rigid guide fingers 28 are mounted in spaced relation on each of the supports 27 and in the embodiment shown can be placed in positions underlying and in direct line with stationary guides 12. When thus situated on supports 27 spaced and positioned as described above, the guide fingers 28 are each aligned with a free space or void intervening adjacent packages of an overlying assembled unnested layer. This arrangement of fingers 28 having the size relationship with the packages hereinafter described is perfectly satisfactory when the number of packages in each row or line does not exceed about four. However, where layers comprising a large number of packages are handled, a more ideal finger arrangement should be used. This is due to the fact that each package in the layer assembly and dropping station 11 is separated from adjacent packages by the thickness of a guide 12 or plate 14 plus a certain amount of clearance, usually about 1/16″, and if there is a substantial number of packages the cumulative effect of such separation causes considerable offset of corresponding freespaces in the layer in station 11 with those in the layer following placement in the case, wherein the peripheral surfaces of the packages are in contact. In the ideal arrangement the upper ends of the fingers 28 are each aligned with one of the freespaces in the assembled layer on the station 11 and the lower portions of the fingers are centered with the free spaces in the encased layers, the intermediate parts of the fingers being curved or angled to interconnect the upper ends of the lower portions thereof. FIGURE 4 illustrates the positions in which the lower portions of fingers 28 are located if the ideal arrangement is employed to funnel the packages inwardly as the layer descends into the case from the station 11.

The fingers 28 can be made of cold-rolled steel bars of square cross-section and when used with a package having the above-mentioned 3″ diameter, desirably measure one and one-sixteenth inch on each side. The square stock is slotted diagonally between two corners, the dimensions of the slot being equal to the thickness and height of the supports 27. Preferably the edges of the upper ends of the fingers are rounded off and the outer surfaces chrome plated. Each of the fingers 28 is suitably affixed to its respective support 27 by means such as the two machine screws indicated at 29. Preferably each finger extends downwardly to a height which will be adjacent the bottom surface of the shipping case when the same is positioned to receive the layer, and in no event should the lower end of the finger 28 be spaced from the bottom of the case by an amount greater than the height of the individual packages.

A case engaging member 31 is located alongside the inner surface of each of the sides 24 of the frame 21. As illustrated most clearly in FIGURE 3, the members 31 comprise a guide bar 32 the length of which extends parallel to the adjacent side 24 and the width of which is vertically oriented. The upper inner side of the bar 32 is beveled at 32a, the depth of the bevel, i.e., the horizontal offset of the top edge of bevel 32a from the bottom edge thereof, being approximately equal to the amount of lateral movement required of the peripheral packages of the layer as it is dropped into the shipping case. This will be more fully explained in the subsequent description.

A number of rigid finger-like extensions 33 depend from the lower inner portion thereof in a row and preferably have sufficient length that the lower ends are at approximately the same elevation as the lower ends of fingers 28 when the members 31 are mounted on the machine, as shown in FIGURE 1. The effective length of the extensions 33, i.e., the length thereof which projects into the case to be loaded, must be at least half the height of the case and the lower end thereof should not be spaced from the bottom of the case by an amount greater than the height of a package when a plurality of layers are to be placed in a case. Preferably, the number of extensions 33 on each member 31 is equal to the number of lines of freespaces which extend perpendicularly to the member or, stated otherwise, is equal to the number of freespaces intermediate adjacent peripheral packages on the side of the layer corresponding with the members 31.

Referring once more to FIGURE 3, any suitable means for fastening the extensions 33 to the bar 32 may be used, as, for example, machine screws 34. The extensions 33 are spaced from each other by a distance equal to the spacing between the successive rows of the layer of packages when encased, and are located and sized to loosely fit within the freespace enclosed by the end packages of adjacent rows of the layer and the interior sidewall of the case. The edges of the upper end of each extension are rounded and therefore help guide the peripheral packages into the proper path of travel during their descent into the case. When using a 3″ diameter package, the extensions 33 are desirably formed from stock of triangular cross-section (see FIGURE 4) having an area approximately ½ that of the guide fingers 28. Thus a piece of 1 1/16″ square cold-rolled steel stock can be cut diagonally in half, chrome plated and utilized for such service.

The bars 32 of two of the case engaging members 31 (those which are adjacent the sides 24 to which suports 27 are welded) are slotted as at 32b of FIGURE 3 to permit the top portion of the bar 32 to extend upwardly to the level of the top of the supports 27 without interfering with the hereinafter described reciprocating action of the members 31. Such reciprocal action is caused by a selectively controlled means comprising double acting, inwardly and outwardly moving power apparatus connected to each member 31 and associated devices to direct such movement in accordance with the casepacking cycle. While the power apparatus could be sliding bars actuated by cams or the like, it has been found most useful to employ power cylinders and suitable valves and sensing devices as the selective control means.

Refering to the left side of FIGURE 1, a power cylinder 36 is fastened to a bushing block 43 bolted to each of the mounting plates 22 on the frame 21. Any suitable means of fastening may be used and as illustrated this may comprise bolted end lugs. Each of the four cylinders extends outwardly at right angles with the side 24 to which the plate 22 is affixed, and therefore at right angles with the case engaging member 31 adjacent that side. Due to such orientation the line of movement of the case engaging members 31 comprising each pair of oppositely disposed members 31 is the same and the line of movement of one such pair of oppositely disposed members 31 is perpendicular to that of the other such pair. The power cylinders 36 may be either hydraulically or pneumatically powered, but for the purpose of the present invention are preferably pneumatic because of the economy of installation and rapidity of operation of such systems as compared with hydraulic systems. In FIGURE 1 only one of the cylinders is shown, this being in section, but it will be understood that the construction and arrangement of each is identical. Although many suitable sizes and types of air cylinders are available, it has been found satisfactory to use Model 171-5-D made by Bimba Manufacturing Company (1½″ bore, 1½″ stroke, double acting, having a threaded rod with wrench flats). When used with air at a pressure of about 100 p.s.i.g., each cylinder is therefore capable of exerting about 177 pounds of force.

The piston 37 of each cylinder is connected to piston rod 39, the outermost end of which is threaded and therewith affixed in a threaded hole of adjustable connecting link 41, most clearly illustrated in FIGURE 3. The other end of the connecting link 41 has a large hole 41a bored therethrough and is formed into a clamping device by means of a transverse slot 41b extending from the adjacent end of the link to the hole 41a. One of the split portions of the link adjacent the slot is clearance drilled and counterbored perpendicular to the slot 41b and the other portion drilled and tapped to receive an Allenhead machine screw by means of which the two portions may be drawn together whereby to reduce the diameter of the hole 41a as desired for clamping engagement with a hardened and ground shaft 42 telescoped within the hole.

Referring to the right side of FIGURE 1, the shaft 42 extends inwardly from the link 41 through a bushing block 43 which is parallel to the stroke of the power cylinder 36. (As a matter of clarification, the section line along which the view of FIGURE 1 is taken is offset from one side to the other, as illustrated by line 1—1 of FIGURE 2. Thus, from the left side of the section to the member 31 on the right side the section is forward of the center line of the frame, through the center of the cylinder 36. The balance of the section is along the frame center line, through the center support 27, the axis of the bushing block 43 and the member 31.) As indicated above, the bushing blocks 43 are fastened to the mounting plates 22, by means of bolts 43a. The inner end of the shaft 42 has a flange 44 threadedly engaged therewith, which flange is in turn affixed to the outer surface of guide bar 32 by means of machine screws or the like.

The bushing block 43 encloses a pair of ball bushings 46 adapted to receive and support shaft 42 and to permit substantially frictionless lateral movement thereof. The bushing block 43 has a full length bore sized to accept the outer periphery of the ball bushings 46 and a spacer member 47 of appropriate length is placed in the bore intermediate the bushings 46. Seal members 38 maintain the bushings 46 in position and protect the same from the entry of dust particles which would affect the operation of the friction-reducing device.

Thus, each of the case engaging members 31 is free to move inwardly or outwardly in accordance with the direction of movement imparted by air admitted to the power cylinder 36. As viewed on the left side of FIGURE 1, if the air enters the cylinder at its inner (right) end and the outer end is connected to exhaust, the pressure will move the piston 37 outwardly and, because of the linkage previously mentioned, the case engaging member 31 will move outwardly. If the air enters the cylinder at its outer end and the inner end is connected to exhaust, the piston 37 and therefore the member 31 will move inwardly.

Each of the power cylinders 36 have a predetermined amount of stroke and consequently, the extent of movement of each of the members 31 from one extreme to another will be fixed by the size of the cylinder. The position of the members 31 may be adjusted by loosening the clamping end of the link 41 so that the shaft 42 can be moved inwardly or outwardly as desired and then reclamping the shaft in the hole 41a. In this connection it is desirable to adjust the position of the members 31 when the pistons 37 are in their outermost (expanded) positions. The members should be adjusted so that the outer surfaces of each of the extensions 33 is set outwardly at least as far as the periphery of the layer will extend following the loading thereof in the shipping case and, preferably, outward of that point by about 1/16".

One of the staed objects of this invention is to encase a layer of packages tightly, as illustrated in FIGURE 4 wherein the packages are touching each other and the interior sidewall of the case. As indicated previously, however, the individual packages are separated from each other in the layer assembly and dropping station 11 and therefore it is necessary for each of the packages to be moved laterally while dropping, the extent of such movement being dependent upon the thickness of the guides 12 and plates 14 and the clearances used in the station 11. Generally speaking, then, the guide fingers 28 adjacent the lateral and longitudinal axes of the case do not have to be specially configured, but those further removed from the axes should be made as per the more ideal arrangement described above. In addition, the guide bars 32 must have their upper surfaces tapered to cause such movement and this is the basis for the earlier statement regarding the depth of the beveled surface 32a. In the illustrated device, the depth of the bevel on a bar 32 should at least equal one and one-half thicknesses of the guides 12 or plates 14 parallel to the bar plus twice the amount of clearance provided between adjacent guides 12 or plates 14. Such, of course, can be readily calculated for any size or configuration of layer. If a layer comprised four rows of six containers each, for example, the bevel on each guide bar parallel to the rows would have the depth described above, but those perpendicular to the rows would have a depth at least equal to two and one-half thicknesses of the guides 12 plus three times the amount of clearance provided therebetween. Returning to the illustrated embodiment, however, when the members 31 are adjusted as described above the upper edges of the respective beveled surfaces 32a would be located outwardly of the inner edges of the overlying outermost guides 12 or plates 14, as the case may be, because of the depth of bevel on the bar 32.

When the piston is in its outermost position, i.e., at the left side of the cylinder cross-section in FIGURE 1, the members 31 will be in their fully expanded positions. When the piston is moved to its innermost extent, the members 31 will each be moved inwardly by an amount corresponding with the stroke of the piston to a contracted position. Due to the fact that the box-like formation of the bars 32 changes in size in accordance with the movement of the piston 37, it will be understood that the bars will have to be made in lengths which will prevent interference with one another as the members are brought to the contracted position.

If both ends of the power cylinder 36 are vented, i.e., connected to exhaust, then obviously the guide bars 32 are each free to move inwardly or outwardly in accordance with the direction in which any extraneous force may be exerted thereon. In this case, the bars will assume a relaxed condition which, as will be understood, is necessary for proper removal of a filled case.

Corresponding sides of each cylinder are connected in parallel and while other suitable arrangements of valves could be used, in the illustrated system the tubing which extends to each of the outer sides of the cylinders 36 is connected to a 4-way valve 49 and that which is connected to the inner sides of each of the cylinders extends to a 3-way valve 51. A short length of tubing interconnects one of the outlet ports of valve 49 with the inlet port of valve 51 and the inlet of valve 49 is in communication with a source of approximately 100 p.s.i.g. pressurized air, not shown. One satisfactorily performing, commercially available, four-way valve which has been used as the valve 49 is a Humphrey Quick Dump Valve, Model 250–4E2, a 1/4" four-way, electrically actuated, double coil, momentary contact type, manufactured by Humphrey Products Division of General Gas Light Company, Kalamazoo, Mich. Model 250 E1–3–11, a normally open 1/4" three-way electrically actuated, single coil, maintained contact type of valve produced by the above-named manufacturer has been satisfactorily employed as valve 51.

Figure 5A:
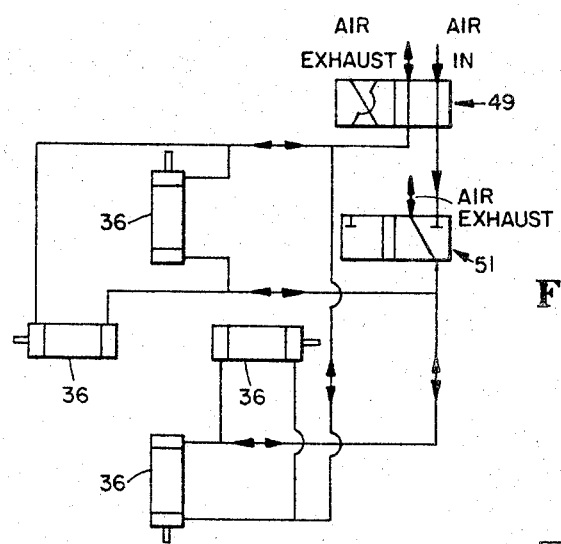
FIGURE 5a is a schematic view similar to FIGURE 5 with the valves positioned to place the case engaging members in a relaxed condition.
Figure 5B:
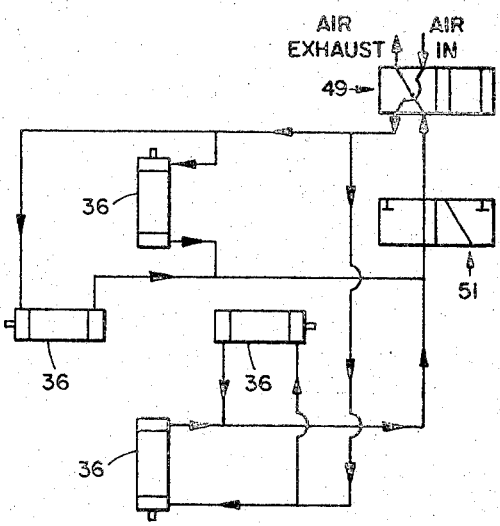
FIGURE 5b is a schematic view similar to FIGURE 5 with the valves positioned to urge the case engaging members to the contracted position.

Regardles sof the specific type of valves employed, the manner in which they are connected and the way in which the valve operation proceeds is shown schematically in FIGURES 5, 5a and 5b. In FIGURE 5 the pressurized air enters the 4-way valve 49, proceeds to the inlet of valve 51 and from there to the innermost sides of the cylinders 36. The outermost sides of the cylinders are vented, i.e., connected to exhaust, through valve 49. Thus, the pressurized air forces each of the pistons outwardly and therefore the case engaging members 31 simultaneously move to the fully expanded position.

In FIGURE 5a the 3-way valve 51 has been actuated causing the tubing extending to the inner ends of the cylinders 36 to be connected with the valve 51 exhaust port. Thus both sides of the cylinder are connected to exhaust (vented to atmosphere) and the members 31 are in their relaxed condition wherein they are freely movable inwardly and outwardly.

In FIGURE 5b the 3-way valve 51 has been returned to its original position and the 4-way valve 49 has been actuated. Under these conditions the pressurized air enters the 4-way valve and is shunted to the tubing leading to the outer ends of the cylinders 36 and the line in communication with the inner ends of the cylinders is shifted to exhaust through valve 49. Consequently, each of the pistons 37 are simultaneously moved inwardly and the members 31 brought to their fully contracted positions.

In order to eliminate any possibility that the members 31 will turn on the shaft 42, a guide pin 52 (see FIGURES 1 and 3) is affixed to each bar 32, extending outwardly in alignment with an aperture 53 located in each side 24 of the frame 21, as shown in FIGURE 2. Each guide pin 52 freely telescopes within the corresponding aperture 53 and its length is at least equal to the length of stroke of the cylinders 36 plus the distance between the outer surfaces of the bar 32 and the outer surface of the side 24 so as to prevent the withdrawal of the pin from the aperture 53 when the member 31 is moved to its contracted position.

Directly below the case locating and stretching device is an elevator plate or table 54 which is bolted to a flange 55 affixed to the upper end of a shaft 56 adapted to be moved upwardly and downwardly. The shaft 56 may be attached to the piston rod of a valve-controlled air cylinder, not shown, designed to raise the plate 54 to a predetermined position or, alternatively, to lower the plate 54 to an unloading position. Thus means, is provided by which a case C can be raised to receive the layer of packages and lowered to receive another layer of packages and/or remove the case following the loading. A suitable arrangement for an elevating table is disclosed in the above-mentioned Ardell patent and therefore is not described in detail herein. Other means for raising and removing the case could also be employed; for example, this operation can be performed by hand, by pivoted levers having gripping means at the end thereof or by any other device capable of carrying a case to and from loading position.

As shown in FIGURES 1 and 3, the case is provided with a liner member L adjacent the sides thereof. When the empty case is supplied to the machine, the liner L is loosely positioned therein in the approximate position ultimately intended for it. Because of the inherent tendency of the corrugated board comprising the liner to return to flat condition, the liner is usually spaced from the inner surface of the sides of the case at various points. Since the case engaging members 31 each move inwardly by an amount equal to the stroke of cylinders 36, however, any minor misalignment of the case with the loading and stretching device, or any spacing of the liner from the sides of the case, will not interfere with the proper operation of the device. In this connection, the extensions 33 in the contracted position have a configuration which is sufficiently small to permit the extensions to be properly received within the bounds of the interior sidewalls of the case in spite of such misalignment and/or spacing. As used herein, the term "interior sidewalls" of a case means the innermost surfaces at each side of the case and, where a liner is used, would comprise the inner surfaces of the liner. Where no liner is used, the term has reference to the inner surfaces of the sides of the case.

In operation, a formed empty case with the top closure flaps opened is placed on the elevator plate 54 in a position approximately below the case locating and stretching device. At this time the case engaging members 31 are in the contracted position. Then the elevating table is raised to its uppermost position in which the extensions 33 and fingers 28 are telescoped in the case. When the case reaches the uppermost position, an impulse is sent to valve 49 from any suitable sensing device; for example, from a limit switch actuated by the case in its raised position. Such sensing device as well as other sensing devices mentioned herein are not shown since the same are well known to those skilled in the art and the particular device used forms no part of this invention. The impulse causes the valve 49 arrangement to be changed from that shown in FIGURE 5b to that of FIGURE 5, wherein air pressure is admitted to the inner sides of cylinders 36 and exhausted from the outer sides thereof. This causes the case engaging members 31 to move outwardly toward their fully expanded position. As the members move outwardly the extensions 33 contact the inner sides of the liner, positioning the same against the inner surfaces of the side of the case adjacent thereto and moving the case as required to properly locate it beneath the layer assembly and dropping station. As the members 31 approach the fully expanded position, the extensions exert considerable pressure on portions of the sidewall of the case spaced from the vertical corners thereof, stretching the sidewalls outwardly to a dimension which equals or preferably exceeds the peripheral dimensions of the layer following loading. Since the corrugated board from which the cases are constructed does not elongate to any substantial extent, the stretching described above is made possible by inward deflection of the vertical corners of the case. Thus the major portion of the sidewalls of the case are bowed outwardly and the corners pulled inwardly whereby the case achieves its maximum potential dimensions for the receipt of the unnested layer of packages. If the case is undersize, the sides of the case will be ripped until the extensions 33 are fully expanded and the case loading operation continued without the possibility of jamming the packages in the funneling guide assembly 19. The ripped case will be filled and later discarded and the packages therein repaced in another case.

Following movement of the members 31 to their expanded position and the assembly of a complete layer of packages, the grid 16 shown in FIGURE 1 is moved to the left to a position in which the grid pockets directly align with the cells formed by the intermeshing stationary and movable guides and plates 12 and 14. Such movement of the grid can be controlled by sensing means which causes the air cylinder 15 to be actuated only when both required conditions are present, i.e., the members 31 in the pressurized expanded position and the layer assembled. When the grid pockets 17 align with the cells, the layer of packages is released and gravity fed into the spaced intervening fingers 28 and extensions 33, as shown in FIGURE 4. As the peripheral packages fall, the outer sides thereof contact inclined surfaces 32a and the packages are deflected inwardly thereby moving them a sufficient amount to compensate for the cumulative separation caused by the thickness of the guides 12 and plates 14 and the clearances therebetween, as discussed above. The fingers 28 and extensions 33 funnel the packages into their proper positions in the case and prevent the packages from moving laterally and/or tilting during the gravity descent.

After the layer has been dropped into the case, a signal is sent to the 3-way valve 51 and the elevator air cylinder control valve, possibly as a delayed signal from the sensing device which actuates air cylinder 15. The signal causes the valve arrangement of the selective control means to change from that shown in FIGURE 5 to that of FIGURE 5a in which both ends of the cylinders 36 are vented to atmosphere. This places the members 31 in a relaxed condition in which each is freely movable independently and thus capable of seeking its own position in an inward or outward direction. The relaxation of the members 31 removes the pressure from the interior sidewalls of the case and therefore eliminates any meaningful amount of frictional drag between the extension 33 and the interior sidewalls or the packages. Due to the change of the members 31 from the pressurized expanded position to a relaxed condition, the air cylinder 15 is deactivated and the spring return arrangement 15a causes the grid 16 to return to its package supporting position. The signal also causes the elevator plate, and therefore the case, to be lowered to strip the case from the case locating and stretching device by virtue of the weight of the filled case.

Following removal of the case an impulse is sent from appropriate sensing means, for example, a limit switch actuated only by a filled case, to valve 49 and the signal to valve 51 is discontinued whereby to change the valve arrangement from that illustrated in 5a to that of 5b in which the air pressure is exerted on the outer side of the cylinders 36 moving the members 31 inwardly to their contracted positions in which they may receive the next empty case.

While the above description pertains to the loading of a case with a single layer of packages it will be understood by those skilled in the art that by making appropriate changes in the sensing circuits the subject device can be employed with casepackers adapted to place a plurality of layers of packages in a case.

Many modificatons of the above invention may be used and it is not intended to hereby limit it to the particular embodiments shown or described. The terms used in describing the invention are used in their descriptive sense and not as terms of limitation, it being intended that all equivalents thereof be included within the scope of the appended claims.

What is claimed is:

1. In a machine for loading a case with an assembled layer of packages having lines of freespaces intermediate adjacent rows, a case locating and stretching device comprising: two pairs of opposed, spaced, case engaging members movable toward and away from each other, the line of movement of one pair being disposed perpendicularly to that of the other pair whereby said members lie in a rectangular configuration substantially aligned with the sides of said layer, at least one extension depending from each said member in the direction of movement of said layer and having an outer surface which is adapted to engage an interior surface of said case, selective control means associated with and simultaneously acting on each pair to force the extensions thereof toward one another to a contracted position, to force the extensions thereof away from each other to an expanded position and to permit independent, substantially free movement of the extensions in an inward and outward direction whereby to assume a relaxed position, said extensions in the contracted position being adapted to readily telescope within an empty said case, in the expanded position to cause each of said extensions to press outwardly against a corresponding interior sidewall of said case to properly locate said case to receive said assembled layer and to increase the interior dimensions of said case to at least equal that which corresponds to the exterior dimensions of said layer following loading and in the relaxed position to permit the loaded case to be easily stripped from said device.

2. In a machine for loading a case with an assembled layer of packages having lines of freespaces intermediate adjacent rows, a case locating and stretching device comprising: two pairs of opposed, spaced, case engaging members movable toward and away from each other, said pairs being disposed perpendicularly to one another whereby to lie in a rectangular configuration substantially aligned with said layer, at least one extension depending from each said member in the direction of movement of said layer and having an outer surface which is adapted to engage an interior surface of said case, selective control means associated with and simultaneously acting on each pair to force the extensions thereof toward one another to a contracted position, to force the extension thereof away from each other to an expanded position and to permit independent, substantially free movement of the extensions in an inward and outward direction whereby to assume a relaxed position, said extensions in the contracted position being adapted to readily telescope within an empty said case, in the expanded position to cause each of said extensions to press outwardly against a corresponding interior sidewall of said case to properly locate said case to receive said assembled layer and to increase the interior dimensions of said case to at least equal that which corresponds to the exterior dimensions of said layer following loading and in the relaxed position to permit the loaded case to be easily stripped from said device, said extensions being directly aligned with the said lines of freespaces in said layer and having a horizontal cross-section permitting a loose fit thereof within the freespaces intermediate the end packages of adjacent rows.

3. The case locating and stretching device of claim 2 in which said extensions have an effective length equal to at least about one-half the height of the case.

4. The case locating and stretching device of claim 2 in which the number of said extensions on each member is equal to the number of said lines of freespaces which extend perpendicularly thereto.

5. The case locating and stretching device of claim 2 in which said selective control means comprises four power cylinders each of which is operatively associated with one of said members.

6. In a machine for loading an assembled rectilinear layer of unnested packages in a case, a case locating and stretching device comprising:

(A) two pairs of parallel, opposed, case engaging members in spaced relation, said members each being aligned with a side of said layer and having a row of rigid, fingerlike extensions depending therefrom, each extension being sized and located to loosely fit within the freespace enclosed by the end packages of adjacent rows of said layer and the interior sidewall of said case;

(B) case handling means to move said case approximately to a position to receive said layer and to remove said case following the loading of said layer; and (C) control means to simultaneously move said members whereby the spacing between each pair is correspondingly changed, said control means causing said control means causing said members selectively to move inwardly to a contracted position in which said extensions loosely telescope within an empty said case and to move outwardly to an expanded position in which the outermost surfaces of said extensions assume a rectangular configuration at least as large in dimension as the periphery of said layer following loading, said control means also selectively causing said members to be independently, substantially freely movable inwardly and outwardly between said expanded and contracted positions.

7. The case locating and stretching device of claim 6 in which the total number of said extensions is equal to the total number of freespaces intermediate the peripheral packages of said layer.

8. The case locating and stretching device of claim 7 in which said extensions have an effective length equal to at least about one-half the height of the case.

9. A case locating and stretching device comprising:

(A) a horizontal, rectangular frame having sides of substantially rigid construction, (B) four guide bars within said frame, said guide bars being in box-like formation with the ends thereof spaced from one another, each guide bar being adjacent and parallel to one side of said frame and having a perpendicularly attached rod extending horizontally outwardly, (C) guide means mounted on each side of the frame to support and guide each said rod for free inward and outward sliding movement, whereby the dimensions of said boxlike formation of said bars may be changed;

(D) simultaneously actuatable power means associated with each rod to selectively move said rods inwardly to a predetermined contracted position and outwardly to a predetermined expanded position, and (E) a row of rigid further-like case engaging extensions depending from each bar.

10. The method of loading an assembled rectilinear layer of unnested packages in a case which comprises:

(A) moving said case into a position directly underlying said layer, (B) applying outward pressure on portions of each of the interior sidewalls of said case spaced from the vertical corners thereof by a distance equal to at least the corresponding dimension of a said package to cause the interior dimensions of said portions to exceed the exterior dimensions of said layer following loading,
(C) dropping said layer into said case while maintaining said outward pressure, and
(D) removing said outward pressure from said portions of said sides.

11. The method of claim 10 in which said portions are spaced, vertically extending areas of the interior sidewalls positioned intermediate adjacent rows of said layer following loading thereof.

References Cited

UNITED STATES PATENTS

| | | | |
|---|---|---|---|
| 2,219,827 | 10/1940 | Kimball et al. | 53—248 X |
| 3,011,297 | 12/1961 | McDevitt | 53—261 |
| 3,264,796 | 8/1966 | Tomczak et al. | 53—261 |

TRAVIS S. McGEHEE, *Primary Examiner.*

R. L. FARRIS, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,404,509                                        October 8, 1968

Arnold E. Schaewe et al.

It is certified that error appears in the above identified patent and that said Letters Patent are hereby corrected as shown below:

Column 1, line 43, "of" should read -- off --. Column 2, lines 62 and 63, "corresponding" should read -- correspondingly --. Column 7, line 43, "staed" should read -- stated --. Column 8, line 43, "Regardles sof" should read -- Regardless of --. Column 12, line 28, cancel "said control means causing"; line 66 "further-like" should read -- finger-like --.

Signed and sealed this 3rd day of March 1970.

(SEAL)
Attest:

Edward M. Fletcher, Jr.                          WILLIAM E. SCHUYLER, JR.
Attesting Officer                                       Commissioner of Patents